(12) United States Patent
Millett et al.

(10) Patent No.: US 8,521,513 B2
(45) Date of Patent: Aug. 27, 2013

(54) LOCALIZATION FOR INTERACTIVE VOICE RESPONSE SYSTEMS

(75) Inventors: Thomas W. Millett, Seattle, WA (US); David Notario, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 12/722,562

(22) Filed: Mar. 12, 2010

(65) Prior Publication Data

US 2011/0224972 A1    Sep. 15, 2011

(51) Int. Cl.
*G06F 17/27* (2006.01)
*G06F 17/28* (2006.01)
*G06F 17/21* (2006.01)
*G10L 21/00* (2006.01)
*G10L 13/00* (2006.01)

(52) U.S. Cl.
USPC ............. 704/9; 704/3; 704/4; 704/8; 704/10; 704/270; 704/270.1; 704/275; 704/258; 704/260

(58) Field of Classification Search
USPC ............... 704/3, 4, 8, 9, 10, 270, 270.1, 275, 704/258, 260
See application file for complete search history.

(56) References Cited

U.S. PATENT DOCUMENTS

| | | | |
|---|---|---|---|
| 6,430,177 B1 | 8/2002 | Luzeski | |
| 6,493,703 B1 | 12/2002 | Knight | |
| 6,513,009 B1 * | 1/2003 | Comerford et al. | ........... 704/270 |
| 6,581,091 B1 | 6/2003 | Ruckmann | |
| 6,598,022 B2 * | 7/2003 | Yuschik | ......... 704/275 |
| 6,606,596 B1 * | 8/2003 | Zirngibl et al. | ............. 704/270 |
| 6,816,468 B1 | 11/2004 | Cruickshank | |
| 6,975,913 B2 | 12/2005 | Kreidler | |
| 7,447,624 B2 | 11/2008 | Fuhrmann | |
| 7,577,561 B2 | 8/2009 | McEntee | |
| 7,680,867 B2 * | 3/2010 | Green et al. | ............ 707/811 |

(Continued)

FOREIGN PATENT DOCUMENTS

| | | |
|---|---|---|
| EP | 0 558 224 A1 | 9/1993 |
| EP | 1 014 653 A2 | 6/2000 |

(Continued)

OTHER PUBLICATIONS

Chinese Fourth Office Action (with English Summary) mailed on Jun. 15, 2011 for Chinese Patent Application No. 200610004622.7, 11 pages.

(Continued)

*Primary Examiner* — Edgar Guerra-Erazo
(74) *Attorney, Agent, or Firm* — Merchant & Gould

(57) ABSTRACT

A language-neutral speech grammar extensible markup language (GRXML) document and a localized response document are used to build a localized GRXML document. The language-neutral GRXML document specifies an initial grammar rule element. The initial grammar rule element specifies a given response type identifier and a given action. The localized response document contains a given response entry that specifies the given response type identifier and a given response in a given language. The localized GRXML document specifies a new grammar rule element. The new grammar rule element specifies the given response in the given language and the given action. The localized GRXML document is installed in an interactive voice response (IVR) system. The localized GRXML document configures the IVR system to perform the given action when a user of the IVR system speaks the given response to the IVR system.

20 Claims, 7 Drawing Sheets

(56) References Cited

U.S. PATENT DOCUMENTS

| | | | |
|---|---|---|---|
| 7,865,358 B2* | 1/2011 | Green et al. | 704/10 |
| 8,225,232 B2 | 7/2012 | Sundararaman et al. | |
| 2002/0035616 A1* | 3/2002 | Diamond et al. | 709/219 |
| 2002/0198719 A1* | 12/2002 | Gergic et al. | 704/270.1 |
| 2003/0018721 A1 | 1/2003 | Gupta | |
| 2003/0061029 A1* | 3/2003 | Shaket | 704/9 |
| 2003/0083882 A1* | 5/2003 | Schemers, III et al. | 704/270.1 |
| 2004/0073431 A1* | 4/2004 | Galanes et al. | 704/270.1 |
| 2004/0085162 A1* | 5/2004 | Agarwal et al. | 333/196 |
| 2004/0153306 A1 | 8/2004 | Tanner | |
| 2004/0189697 A1* | 9/2004 | Fukuoka et al. | 345/748 |
| 2004/0203664 A1 | 10/2004 | Lei | |
| 2005/0028085 A1* | 2/2005 | Irwin et al. | 715/513 |
| 2005/0080628 A1* | 4/2005 | Kuperstein | 704/270.1 |
| 2005/0203747 A1* | 9/2005 | Lecoeuche | 704/270.1 |
| 2006/0026506 A1* | 2/2006 | Kristiansen et al. | 715/517 |
| 2006/0230410 A1* | 10/2006 | Kurganov et al. | 719/311 |
| 2007/0043569 A1* | 2/2007 | Potter et al. | 704/270 |
| 2007/0055751 A1 | 3/2007 | Sundararaman et al. | |
| 2007/0203708 A1 | 8/2007 | Polcyn | |
| 2008/0189096 A1 | 8/2008 | Apte | |
| 2008/0221896 A1 | 9/2008 | Cai | |

FOREIGN PATENT DOCUMENTS

| | | |
|---|---|---|
| EP | 1 113 631 A2 | 7/2001 |
| EP | 1 298 905 A2 | 4/2003 |
| JP | 3-78861 | 4/1991 |
| JP | 5-289840 | 11/1993 |
| JP | 7-78047 | 3/1995 |
| JP | 2002-524806 | 8/2002 |
| JP | 2003030422 A | 1/2003 |
| JP | 2003030541 A | 1/2003 |
| JP | 2003-60790 | 2/2003 |
| JP | 2003115929 A | 4/2003 |
| JP | 2003186793 A | 7/2003 |
| JP | 2004-341909 | 12/2004 |

OTHER PUBLICATIONS

Japanese Notice of Rejection (translated) mailed on Feb. 1, 2011 for JP Patent Application No. 2006-017381, 3 pages.
Modeling System of User Interface Based on Metamodel; English Abstract included at p. 9; Mar. 31, 2004; 56 pages.
U.S. Non-Final Office Action cited in U.S. Appl. No. 11/068,691 mailed Aug. 23, 2007.
U.S. Final Office Action cited in U.S. Appl. No. 11/068,691 mailed Apr. 17, 2008.
U.S. Final Office Action cited in U.S. Appl. No. 11/068,691 mailed Oct. 8, 2008.
U.S. Non-Final Office Action cited in U.S. Appl. No. 11/068,691 mailed Mar. 19, 2009.
U.S. Final Office Action cited in U.S. Appl. No. 11/068,691 mailed Nov. 23, 2009.
U.S. Non-Final Office Action cited in U.S. Appl. No. 11/068,691 mailed May 11, 2011.
Assouad et al., Build Voice Presentation Layers for Delivering Applications to Phones, Copyright © 1994-2009 SYS-CON Media, 9 pages.
Blanchard et al.; Voice Messaging User Interface, accessed at: http://www.hblanchard.com/pubs/Blanchard_Voice_Messaging.pdf#search='user%20intrface%20applications%20state%20machine; date accessed Jan. 31, 2005.
International Search Report for EP Application No. EP-06-10-0666, dated Jun. 21, 2006 3 pages.
Mansoor, Aadil; Telephony, Copyright © 2001, 13 pages.
McGlashan et al.; Voice Extensible Markup Language, Oct. 23, 2001, 193 pages.
Overview of Unified Messaging, Copyright 2010, 21 pages.
Upgrading Speech Application SDK Version 1.0 Applications, Copyright 2010, 4 pages.
Hunt et al.; Speech Recognition Grammar Specification, Version 1.0, Mar. 16, 2004, 78 pages.
Notice of Rejection (English Translation) mailed on Mar. 6, 2012 for Japanese Patent Application No. 2006-017381, 7 pages.
Notice of Allowance mailed Dec. 5, 2011 in co-pending U.S. Appl. No. 11/068,691.
Notice of Allowance mailed Apr. 17, 2012 in co-pending U.S. Appl. No. 11/068,691.

* cited by examiner

LOCALIZATION FOR INTERACTIVE VOICE RESPONSE SYSTEMS

BACKGROUND

An Interactive Voice Response (IVR) system is a system that provides voice output to one or more users and responds to voice input from one or more users. IVR systems can serve a variety of purposes. For example, IVR systems can enable users to use telephones to access their bank accounts. In another example, IVR systems enable users to use telephones to book flights.

To accomplish these purposes, an IVR system speaks a series of prompts to a user. In response to the prompts, the user speaks responses back to the IVR system. When the IVR system receives a response from the user, the IVR system performs one or more actions associated with the response. For example, the IVR system can tell the user how much money is in a bank account and then speak another prompt to the user.

Speech Grammar XML (GRXML) documents contain grammar rule elements. Each grammar rule element is an XML element that specifies responses and actions to be performed when the responses are received. For example, a grammar rule element can specify that "Thursday" is a response and specify how a particular variable is to be manipulated when the response "Thursday" is received. Many IVR systems use such GRXML documents to control which responses are valid and which actions to perform when users speak response to the responses.

In today's globalized economy, IVR systems need to be adapted for use by people who speak different languages. For example, an IVR system used by an airline may need to speak prompts and receive responses in English, French, and German. To adapt an IVR system for use by people who speak a given language, the GRXML document used by the IVR system has to be adapted to the given language. Because GRXML documents contain many nested XML elements, attributes, comments, and other data, GRXML documents can be difficult for untrained people to read. Because GRXML documents can be difficult for untrained people to read, the costs of adapting GRXML documents to various languages can be high.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

In one aspect, a method comprises using, by a computing system, a language-neutral speech grammar extensible markup language (GRXML) document and a localized response document to build a localized GRXML document. The language-neutral GRXML document and the localized response document are separate documents. The language-neutral GRXML document specifies an initial grammar rule element. The initial grammar rule element specifies a given response type identifier and a given action. The localized response document contains a given response entry that specifies the given response type identifier and a given response in a given language. The localized GRXML document specifies a new grammar rule element. The new grammar rule element specifies the given response in the given language and the given action. The method also comprises installing the localized GRXML document in an IVR system. The localized GRXML document configures the IVR system to perform the given action when a user of the IVR system speaks the given response to the IVR system.

In another aspect, a computing system comprises a processing system and a data storage system comprising instructions that, when executed by the processing system, cause the computing system to use a language-neutral GRXML document and a localized response document to build a localized GRXML document. The language-neutral GRXML document and the localized response document are separate documents. The language-neutral GRXML document specifies an initial grammar rule element. The initial grammar rule element specifies a given response type identifier and a given action. The localized response document contains a given response entry that specifies the given response type identifier and a given response in a given language. The localized GRXML document specifies a new grammar rule element. The new grammar rule element specifies the given response in the given language and the given action. The localized GRXML document, when installed at an IVR system, configures the IVR system to perform the given action when a user of the IVR system speaks the given response to the IVR system.

In yet another aspect, a computer-readable data storage medium comprises instructions that, when executed by a processing system of a computing system, cause the computing system to receive a localized prompt document comprising a prompt entry that specifies a prompt identifier and a prompt. The prompt is in a given language. The instructions, when executed by the processing system, also cause the computing system to receive a language-neutral GRXML document that specifies a grammar rule element. The grammar rule element specifies a grammar rule identifier, a given response type identifier, and a given action. The grammar rule element contains a parameter element. The parameter element specifies another grammar rule identifier that identifies another grammar rule element in the language-neutral GRXML document. The instructions, when executed by the processing system, also cause the computing system to receive a localized response document containing a plurality of response entries. The plurality of response entries include a given response entry. The given response entry specifies the given response type identifier and a plurality of responses in the given language. The plurality of responses includes a given response. The given response contains a parameter indicator that indicates the parameter element. The instructions, when executed by the processing system, also cause the computing system to use the given response type identifier to identify the given response entry from among the plurality of response entries. The instructions, when executed by the processing system, also cause the computing system to generate a new GRXML document. The new GRXML document does not initially contain any XML elements. The instructions, when executed by the processing system, also cause the computing system to add a new grammar rule element to the new GRXML document. The new grammar rule element specifies the grammar rule identifier. For each response in the plurality of responses, the instructions, when executed by the processing system, cause the computing system to add a new localized response element to the new grammar rule element. The new localized response element specifies the response and the given action. The instructions, when executed by the processing system, also cause the computing system to add the parameter element to the new localized response element. In addition, the instructions, when executed by the processing system, cause the computing system to identify keywords in the prompt by identifying keywords enclosed by delimiters. The instructions, when executed by the processing system, also cause the computing system to output a warning when one or more of the keywords is not one of the plurality of responses specified by the given response entry. Furthermore, the instructions, when executed by the processing system, cause the computing system to output a warning when two or more responses in the plurality of responses specified by the given response entry in the localized response document are acoustically confusable. The instructions, when executed by the processing system, also cause the computing system to output a warning when an IVR system is not configured to recognize one or more responses in the plurality of responses specified by the given response entry. The instructions, when executed by the processing system, also cause the computing system to install the localized prompt document in the IVR system. The IVR system is configured to speak the prompt to a user of the IVR system. The instructions, when executed by the processing system, also cause the computing system to install a finite state machine (FSM) document in the IVR system. The FSM document contains a menu element. The menu element contains a prompt identifier element and a grammar identifier element. The prompt identifier element specifies the prompt identifier. The grammar identifier element specifies the grammar rule identifier that identifies the grammar rule element. The instructions, when executed by the processing system, also cause the computing system to install the new GRXML document in the IVR system. The new GRXML document configures the IVR system to perform the given action when the user of the IVR system speaks the given response to the IVR system.

DETAILED DESCRIPTION

Figure 1:
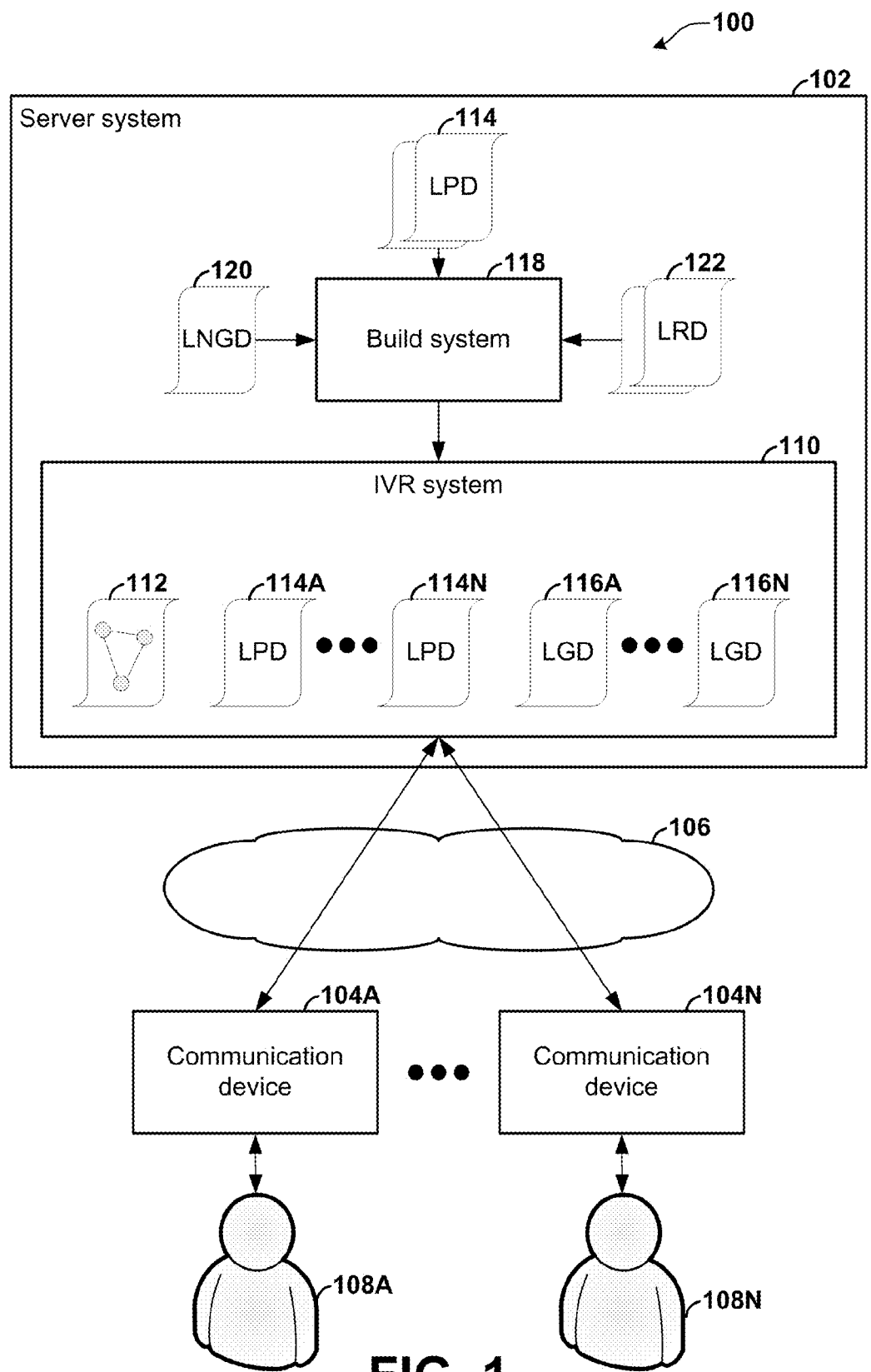
FIG. 1 illustrates an example communication system.

FIG. 1 illustrates an example communication system 100. As illustrated in the example of FIG. 1, the communication system 100 includes a server system 102, communication devices 104A-104N (collectively, "communication devices 104"), and a network 106.

The server system 102 is a system comprising one or more computing devices. The communication devices 104 are computing devices that enable users 108A-108N (collectively, "users 108") to communicate with the server system 102. A computing device is a physical device that processes information. Example types of computing devices include personal computers, laptop computers, standalone server computers, blade server computers, supercomputers, mainframe computers, handheld computers, mobile telephones, telephones, personal media players, video game consoles, point-of-sale computers, television set top boxes, network-connected televisions, computers integrated into vehicles, intermediate network devices, and other types of physical devices that process information. The server system 102 can comprise one or more of these and/or other types of computing devices. Similarly, the communication devices 104 can belong to these or other types of computing devices.

Computing devices, such as the communication devices 104 and those in the server system 102, perform particular actions when processing systems in the computing devices execute instructions. As used herein, a processing system is a set of one or more integrated circuits that operates to selectively execute instructions. In some embodiments, such instructions are stored in data storage systems. As used herein, a data storage system is a set of one or more computer-readable data storage media. A computer-readable data storage medium is a physical device or article of manufacture that is capable of storing data and instructions in such a way that a computing device can read the data and instructions. In some instances, such computer-readable data storage media are parts of computer program products. In other embodiments, computing devices receive the instructions via a communication medium, such as a wired or wireless network connection. Execution of instructions operates to transform general purpose computing devices into special-purpose computing devices. Furthermore, in some embodiments, application specific integrated circuits (ASICs) or field-programmable gate arrays (FPGAs) cause computing devices, such as the communication devices 104 and those in the server system 102, to perform particular actions.

The network 106 is a collection of computing devices and links that facilitate communication among the communication devices 104 and the server system 102. In various embodiments, the network 106 includes various types of computing devices. For example, the network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices. In various embodiments, the network 106 includes various types of links. For example, the network 106 can include wired and/or wireless links Furthermore, in various embodiments, the network 106 is implemented at various scales. For example, the network 106 can be implemented as one or more local area networks (LANs), metropolitan area networks, subnets, wide area networks (such as the Internet), or can be implemented at another scale.

Each of the communication devices 104 is associated with a different one of the users 108. The users 108 are human beings that use the communication devices 104 to communicate with the server system 102.

The server system 102 provides an Interactive Voice Response (IVR) system 110. An IVR system is a system that provides voice output to one or more users and responds to voice input from one or more users. In various embodiments, the IVR system 110 can serve a variety of purposes. For example, in some embodiments, the IVR system 110 enables the users 108 to access their bank accounts. In other embodiments, the IVR system 110 enables the users 108 to check messages. In yet other embodiments, the IVR system 110 enables the users 108 to book flights.

To use the IVR system 110, the users 108 use the communication devices 104 to establish voice telephony sessions with the IVR system 110. In various embodiments, the users 108 can use the communication devices 104 to establish voice telephony sessions with the IVR system 110 in various ways.

For example, the user 108A can use the communication device 104A to establish a voice telephony session with the IVR system 110 by dialing a telephone number associated with the IVR system 110 on a physical or virtual keypad of the communication device 104A. In another example, the user 108N can use the communication device 104N to establish a voice telephony session with the IVR system 110 by providing a voice command to the communication device 104N.

A voice telephony session is a communication session that participating entities can use to communicate vocally. A communication session is a synchronous interchange of data that starts at one time and ends at a later time. After a voice telephony session is established between one of the communication devices 104 and the IVR system 110, the communication device and the IVR system 110 exchange audio data over the voice telephony session. The audio data is data that represents audio. When the communication device receives audio data over the voice telephony session, the communication device uses a speaker to present audio represented by the audio data to the user of the communication device. In this way, the IVR system 110 "speaks to" the user. When the user speaks, the communication device generates audio data representing the sounds spoken by the user and transmits this audio data to the IVR system 110 over the voice telephony session. In this way, the user "speaks to" the IVR system 110.

When one of the users 108 establishes a voice communication session with the IVR system 110, the IVR system 110 speaks a prompt to the user. A prompt is a phrase that prompts a user to speak a response back to the IVR system 110. For example, the IVR system 110 can speak the following prompt to the user: "Please say the date on which you would like to fly." In some circumstances, a prompt specifies what the user is allowed to speak as a response. For example, the IVR system 110 can speak the following prompt to the user: "What type of content would you to access? Please say voicemail, calendar, contacts, or directory."

When the user speaks a response to the IVR system 110 in response to a prompt, the IVR system 110 can transition from one state to another state. When the IVR system 110 transitions from one state to another state, the IVR system 110 performs one or more actions, such as manipulating data and speaking prompt. For example, if the IVR system 110 says "please choose e-mail or voicemail" to the user, the IVR system 110 can perform different actions depending on whether the user says "e-mail" or "voicemail" to the IVR system 110. For instance, in this example, if the user says "e-mail" to the IVR system 110, the IVR system 110 opens the user's e-mail box and says "would you like to hear your first unread e-mail message?" In this example, if the user says "voicemail" to the IVR system 110, the IVR system 110 accesses the user's voicemail box and says "would you like to hear your first new voicemail?"

A finite state machine (FSM) document 112 defines a finite state machine. A finite state machine is a finite set of states, a set of transitions between states in the set of states, and actions. When the user speaks a response to the IVR system 110, the IVR system 110 can transition from a given state to another one of the states (or back to the given state) in accordance with the FSM defined by the FSM document 112. In various embodiments, the FSM document 112 defines the FSM in various ways. For example, in some embodiments, the FSM document 112 defines the FSM using extensible markup language (XML) in the manner described in U.S. patent application Ser. No. 11/068,691, the entirety of which is hereby incorporated by reference. In other embodiments, the FSM document 112 defines the FSM in other ways.

The FSM document 112 contains menu elements for at least some states in the FSM. Each menu element specifies a prompt identifier. In addition, each menu element can specify a grammar rule identifier. The prompt identifier is an identifier for a prompt. The grammar rule identifier is an identifier for a grammar rule element. A grammar rule element is an element that specifies one or more responses and actions to perform in response to each of the one or more responses. When the FSM document 112 specifies a prompt identifier and a grammar rule identifier for a given state and the IVR system 110 transitions to the given state, the IVR system 110 speaks the prompt identified by the prompt identifier to a user. In addition, the IVR system 110 performs the action specified by the grammar rule element identified by the grammar rule identifier when the user speaks one of the responses specified by the grammar rule element.

A set of one or more localized prompt documents 114A-114N (collectively, "localized prompt documents 114") are installed in the IVR system 110. A localized prompt document is installed in the IVR system 110 when the localized prompt document is at a location where the IVR system 110 is configured to access the localized prompt document. Each of the localized prompt documents 114 contains a set of prompt entries. Each of the prompt entries specifies a prompt. The prompts in different ones of the localized prompt documents 114 are in different languages. For example, the localized prompt document 114A can contain prompts in the English language and the localized prompt document 114B can contain prompts in the Russian language. In this document, different dialects of a language associated with different cultures are discussed as different languages.

Each prompt entry in the localized prompt documents 114 also contains a prompt identifier. Prompt entries containing prompts that have the same meaning in different languages are identified by the same prompt identifier. For example, a prompt that states choices of a main menu in the English language and a prompt that states choices of the main menu in the Russian language can both be identified by a prompt identifier "pMainMenu."

When one of the users 108 is speaking in a given language and the IVR system 110 transitions to a given state of the FSM, the IVR system 110 retrieves, from the localized prompt document associated with the given language, a prompt contained by the prompt entry that contains the prompt identifier of the given state. The IVR system 110 then speaks the retrieved prompt to the user. In this way, the user hears the prompt in the given language.

A set of localized grammar XML (GRXML) documents 116A-116N (collectively, "localized GRXML documents 116") are installed in the IVR system 110. The localized GRXML documents 116 configure the IVR system 110 to perform actions specified by the localized GRXML documents 116 when the users 108 speak responses specified by the localized GRXML documents 116 to the IVR system 110. A localized GRXML document is installed in the IVR system 110 when the localized GRXML document is at a location where the IVR system 110 is configured to access the localized GRXML document. Each of the localized GRXML documents 116 is a GRXML document is associated with a different language. A GRXML document is a document containing XML data conforming to a schema defined by the Speech Recognition Grammar Specification provided by the W3C Consortium, the entirety of which is hereby incorporated by reference.

Each of the localized GRXML documents 116 contains one or more grammar rule elements. A localized GRXML document is associated with a language when the localized GRXML document contains grammar rule elements that specify one or more responses in the language and actions to perform in response to each of the one or more responses. For example, a localized GRXML document is associated with the English language when the localized GRXML document contains grammar rules that specify one or more responses in the English language and actions to perform in response to each of the one or more responses. In some embodiments, the localized GRXML documents 116 contain data specifying the languages associated with the localized GRXML documents 116. For instance, in some embodiments, a top level element of a localized GRXML document contains an attribute that specifies the language associated with the localized GRXML document.

Each grammar rule element in the localized GRXML documents 116 is identified by a grammar rule identifier. Grammar rule elements that specify responses having the same meaning in different languages are identified by the same grammar rule identifier. For example, a grammar rule element that specifies responses in the English language to a given prompt regarding a main menu and a grammar rule that specifies responses in the Russian language to the same given prompt can both be identified by a grammar rule identifier "grMainMenu."

When one of the users 108 is speaking in a particular language and the IVR system 110 is in a given state of the FSM, the IVR system 110 retrieves, from the localized GRXML document associated with the particular language, a grammar rule element identified by the grammar rule identifier of the given state. The IVR system 110 then performs an action specified by the retrieved grammar rule element when the user speaks one of the responses specified by the retrieved grammar rule element. In this way, the user is able to speak responses to the IVR system 110 in the particular language.

As illustrated in the example of FIG. 1, the server system 102 provides a build system 118. In other embodiments, the build system 118 is provided by one or more computing devices that are not part of the server system 102. The build system 118 generates the localized GRXML documents 116 and installs the localized GRXML documents 116 in the IVR system 110. The build system 118 uses a language-neutral GRXML document 120 and a set of localized response documents 122 to generate the localized GRXML documents 116.

Like the localized GRXML documents 116, the language-neutral GRXML document 120 contains one or more grammar rule elements. As discussed above, each of the localized GRXML documents 116 specifies a set of one or more responses and actions to perform in response to each of the responses. However, each of the grammar rule elements in the language-neutral GRXML document 120 specifies one or more response type identifiers and actions. A response type identifier is an identifier for a response type. A response type is a set of words in a language that have essentially the same meaning.

Each of the localized response documents 122 is associated with a different language. For example, one of the localized response documents 122 can be associated with the Spanish language and another one of the localized response documents 122 can be associated with the Japanese language. Each of the localized response documents 122 contains response entries. Each response entry specifies one or more responses belonging to a response type. The responses specified by the response entries of a localized response document are in the language associated with the localized response document.

Each response entry in the localized response documents 122 contains a response type identifier. Response entries in different localized response documents that contain responses that have the same meanings in different languages contain the same response type identifier. For example, a response entry containing the English language word for Monday and a response entry containing the Swahili language words for Monday can both contain the same response type identifier "grMonday."

When the build system 118 generates a localized GRXML document associated with a particular language, the build system 118 scans through the language-neutral GRXML document 120. For each response type identifier in a grammar rule of the language-neutral GRXML document 120, the build system 118 retrieves the responses specified by a response entry that specifies the response type identifier from the localized response document associated with the particular language. The build system 118 then effectively replaces the response type identifier in the language-neutral GRXML document 120 with responses specified by the response entry. The build system 118 repeats this for each of the localized response documents 122. In this way, the build system 118 generates the localized GRXML documents 116.

Furthermore, the build system 118 can use the FSM document 112, the localized prompt documents 114, the language-neutral GRXML document 120, and/or the localized response documents 122 to perform one or more localization tests. A localization test is a test to determine whether the IVR system 110 would perform as intended using a localized prompt document and a localized GRXML document. For example, the build system 118 can perform a test that determines whether responses specified by a grammar rule element can be acoustically confused.

Figure 2:
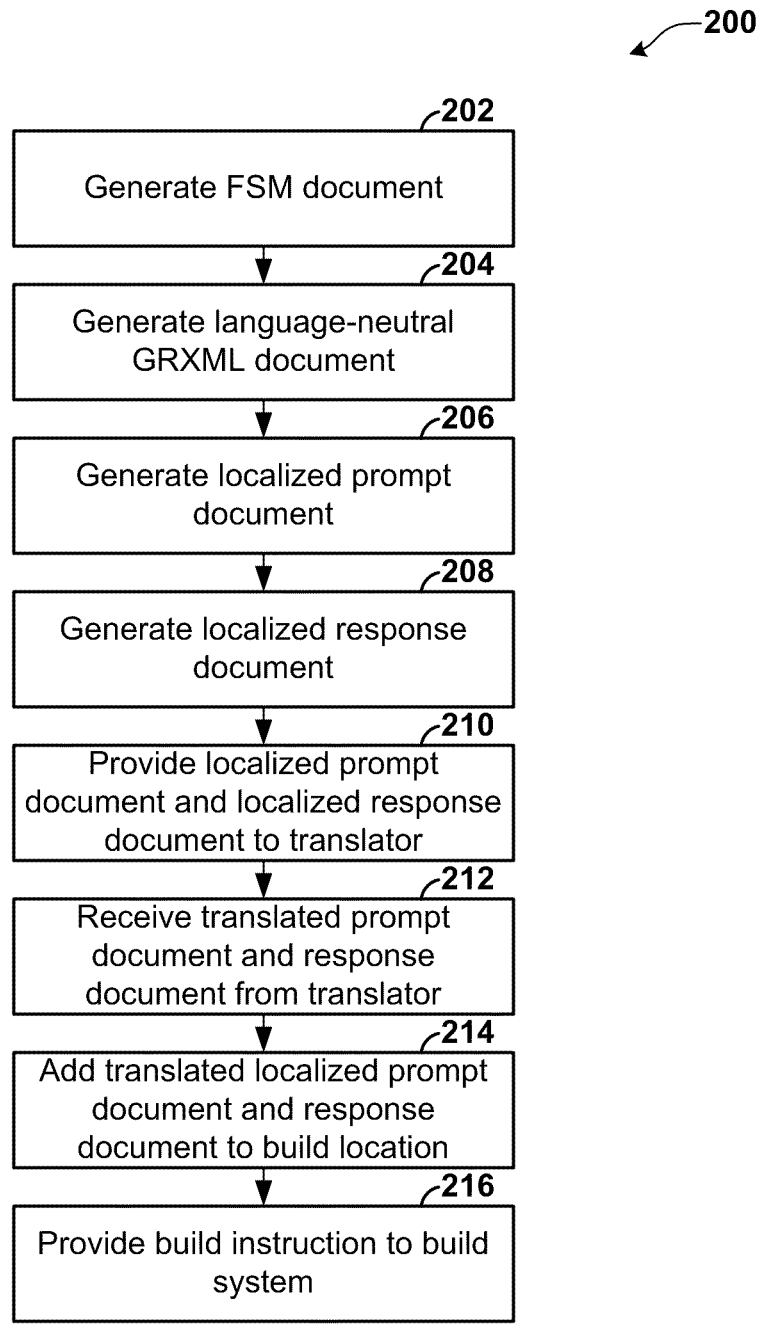
FIG. 2 is a flowchart illustrating an example operation performed by a developer.

FIG. 2 is a flowchart illustrating an example operation 200 performed by a developer. It should be appreciated that the operation 200 and other operations described in this disclosure are examples. In other embodiments, the operation 200 and the other operations described in this disclosure can include more, fewer, or different steps or include the steps in different orders.

In various embodiments, the developer can be a variety of people. For example, in some embodiments, the developer is an employee or contractor of an enterprise that develops the IVR system 110. In other embodiments, the developer is an employee or contractor of an enterprise that customizes IVR systems for particular clients.

As illustrated in the example of FIG. 2, the operation 200 begins when the developer generates the FSM document 112 (202). As described briefly above, the FSM document 112 comprises menu elements. Each menu item corresponds to a state in the FSM defined by the FSM document 112. A menu element is an element that comprises a prompt identifier element and a grammar identifier element. A prompt identifier element specifies a prompt identifier. A grammar identifier element specifies a grammar rule identifier. In various embodiments, the menu elements in the FSM document 112 are formatted in various ways. For example, in some embodiments, the menu elements in the FSM document 112 are formatted like the following menu element:

```
<Menu>
    <Prompt id="MainMenuPrompt"/>
    <Grammar rule="MainMenuGrammarRule"/>
</Menu>
```

In this example, the menu element comprises a prompt element that specifies the prompt identifier "MainMenuPrompt"

and a grammar identifier element that specifies the grammar rule identifier "MainMenuGrammarRule."

Next, the developer generates the language-neutral GRXML document 120 (204). As briefly described above, the language-neutral GRXML document 120 comprises one or more grammar rule elements. A grammar rule element is an XML element that specifies one or more language-neutral response elements. Each of the language-neutral response elements specifies a response type identifier element and an action element. The response type identifier element specifies a response type identifier. The action element specifies an action. When the IVR system 110 receives a response belonging to a response type identified by the response type identifier, the IVR system 110 performs the action specified by the action element. In various embodiments, the grammar rule elements in the language-neutral GRXML document 120 are formatted in various ways. Continuing the example of the previous paragraph, the grammar rule elements in the language-neutral GRXML document 120 are, in some embodiments, formatted like the following grammar rule element:

```
<rule id="MainMenuGrammarRule">
  <one-of>
    <item>
      <loc id="grVoicemail"/>
      <tag>$.RecoEvent=recoVoicemail</tag>
    </item>
    <item>
      <loc id="grCalendar"/>
      <tag>$.RecoEvent=recoCalendar</tag>
    </item>
    <item>
      <loc id="grContacts"/>
      <tag>$.RecoEvent=recoContacts</tag>
    </item>
    <item>
      <loc id="grDirectory"/>
      <tag>$.RecoEvent=recoDirectory</tag>
    </item>
  </one-of>
</rule>
```

In this example, the id attribute of the grammar rule element specifies "MainMenuGrammarRule". In this way, the grammar identifier element of the menu element identifies this grammar rule element. Furthermore, in this example, the grammar rule element specifies four language-neutral response elements. The first language-neutral response element contains a response type identifier element that specifies the response type identifier "voicemail" and an action element that specifies the action "$.RecoEvent=recoVoicemail". This action sets the variable RecoEvent to the value "recoVoicemail." The second language-neutral response element contains a response type identifier element that specifies the response type identifier "calendar" and an action element that specifies the action "$.RecoEvent=recoCalendar". This action sets the variable RecoEvent to the value "recoCalendar". The third language-neutral response element contains a response type identifier element that specifies the response type identifier "contacts" and an action element that specifies the action "$.RecoEvent=recoContacts". This action sets the variable RecoEvent to the value "recoContacts". The fourth language-neutral response element contains a response type identifier element that specifies the response type identifier "directory" and an action element that specifies the action "$.RecoEvent=recoDirectory". This action sets the variable RecoEvent to the value "recoDirectory".

The developer then generates a localized prompt document (206). As described briefly above, localized prompt documents are documents that comprise prompt entries. A prompt entry is an entry that specifies a prompt. In various embodiments, the prompt entries in the localized prompt documents 114 are formatted in various ways. Continuing the example of the previous paragraph, in some embodiments, the prompt entries in the localized prompt documents 114 are formatted like the following prompt entries:

MainMenuPrompt=Please say, 'voicemail', 'calendar', 'contacts', or 'directory'

VoicemailPrompt=Please say 'play again', 'save', or 'discard'

In this example, there are two prompt entries. The first prompt entry specifies a prompt identifier "MainMenuPrompt" and a prompt "Please say, 'voicemail', 'calendar', 'contacts', or 'directory'". Note that the prompt identifier element in the example menu element described above specifies the prompt identifier "MainMenuPrompt". In this way, the menu element indicates that the first prompt entry is to be used with the menu element. The second prompt entry specifies a prompt identifier "VoicemailPrompt" and a prompt "Please say 'play again', 'save', or 'discard'".

In addition, the developer generates a localized response document (208). The localized prompt document and the localized response document are associated with the same language. For example, the localized prompt document and the localized response document can both be associated with the Hindi language. As briefly described above, localized response documents are documents that comprise response entries. A response entry is an entry that specifies a response type identifier and one or more responses belonging to a response type. In various embodiments, the response entries in the localized response documents 122 are formatted in various ways. Continuing the example of the previous paragraph, in some embodiments, the response entries in the localized response documents 122 are formatted like the following response entries:

grVoicemail=voicemail
grCalendar=calendar
grContacts=contacts
grDirectory=directory In this example, there are four response entries. The first response entry specifies the response type identifier "grVoicemail" and the response "voicemail". The second response entry specifies the response type identifier "grCalendar" and the response "calendar". The third response entry specifies the response type identifier "grContact" and the response "contacts". The fourth response entry specifies the response type identifier "grDirectory" and the response "directory".

A response entry can specify a plurality of responses belonging to a response type. Each response belonging to a response type has essentially the same meaning for the purposes of the IVR system 110. For example, the localized response document can include the following response entry:

grTelephone=phone; telephone; mobile;

In this example, "phone," "telephone," and "mobile" belong to a response type having the response type identifier "grTelephone".

In some embodiments, language-neutral response elements in the grammar rule elements of the language-neutral GRXML document 120 can include one or more parameter elements. A parameter element specifies a grammar rule identifier that identifies another grammar rule element in the language-neutral GRXML document 120. For example, the language-neutral GRXML document 120 can include the following grammar rule element:

```
<rule id="ConfirmCalendarDate">
  <tag>$.RecoEvent={ };</tag>
  <one-of>
    <item>
      <loc id="grCalendarDateCorrection">
        <loc-param><ruleref uri="#CalendarDate"/></loc-param>
      </loc>
    </item>
  </one-of>
</rule>
```

In this example, the language-neutral GRXML document 120 contains a grammar rule element that has an id attribute of "ConfirmCalendarDate". The grammar rule element contains a language-neutral response element that contains a response type identifier element that specifies the response type identifier "grCalendarDateCorrection" and a parameter element that specifies a grammar rule identifier "CalendarDate". In this way, the parameter element specifies a grammar rule element having the grammar rule identifier "CalendarDate".

Responses in response entries in the localized response documents 122 contain parameter indicators that indicate parameter elements. Users of the IVR system 110 can speak responses specified by another grammar rule element at the parameter indicator. When a translator translates a response containing a parameter indicator to a target language, the translator is allowed to move the parameter indicator within the response as needed for translation to the target language. In various embodiments, the parameter indicators are formatted in various ways. For example, in some embodiments, parameter indicators are bracketed numbers. In other embodiments, parameter indicators are specially indicated words. Continuing the example of the previous paragraph, the localized response document can include the following response entry:

grCalendarDateCorrection=no, I said {0}; I said {0}

In this example, the bracketed number "{0}" is a parameter indicator.

After generating the localized prompt document and the localized response document, the developer provides the localized prompt document and the localized response document to a translator (210). The developer does not need to provide the FSM document 112 or the language-neutral GRXML document 120 to the translator.

Subsequently, the developer receives a translated localized prompt document and a translated localized response document from the translator (212). The translated localized prompt document and the translated localized response document are both associated a language other than the language associated with the original localized prompt document and the original localized response document. For example, the original localized response document can contain the following response entries:

MainMenuPrompt=Please say, 'voicemail', 'calendar', 'contacts', or 'directory'

VoicemailPrompt=Please say 'play again', 'save', or 'discard'

In this example, the translated localized response document associated with the French language can contain the following response entries:

MainMenuPrompt=S'il vous plaît dites, 'messagerie vocale', 'agenda', 'contacts', ou 'répertoire'

VoicemailPrompt=S'il vous plaît dites 'rejouer', 'sauver', ou 'se défaire'

After receiving the translated localized prompt document and the translated localized response document, the developer adds the translated localized prompt document and the translated localized response document to a build location (214). The build location is a location in a document retrieval system where the build system 118 is configured to retrieve localized prompt documents and localized response documents. In other embodiments, the developer performs other actions (e.g., generating a build file) to configure the build system 118 to retrieve the translated localized prompt document and the translated localized response document at build time.

Subsequently, the developer provides a build instruction to the build system 118 (216). The build instruction instructs the build system 118 to perform a build process to generate localized GRXML documents.

Figure 3:
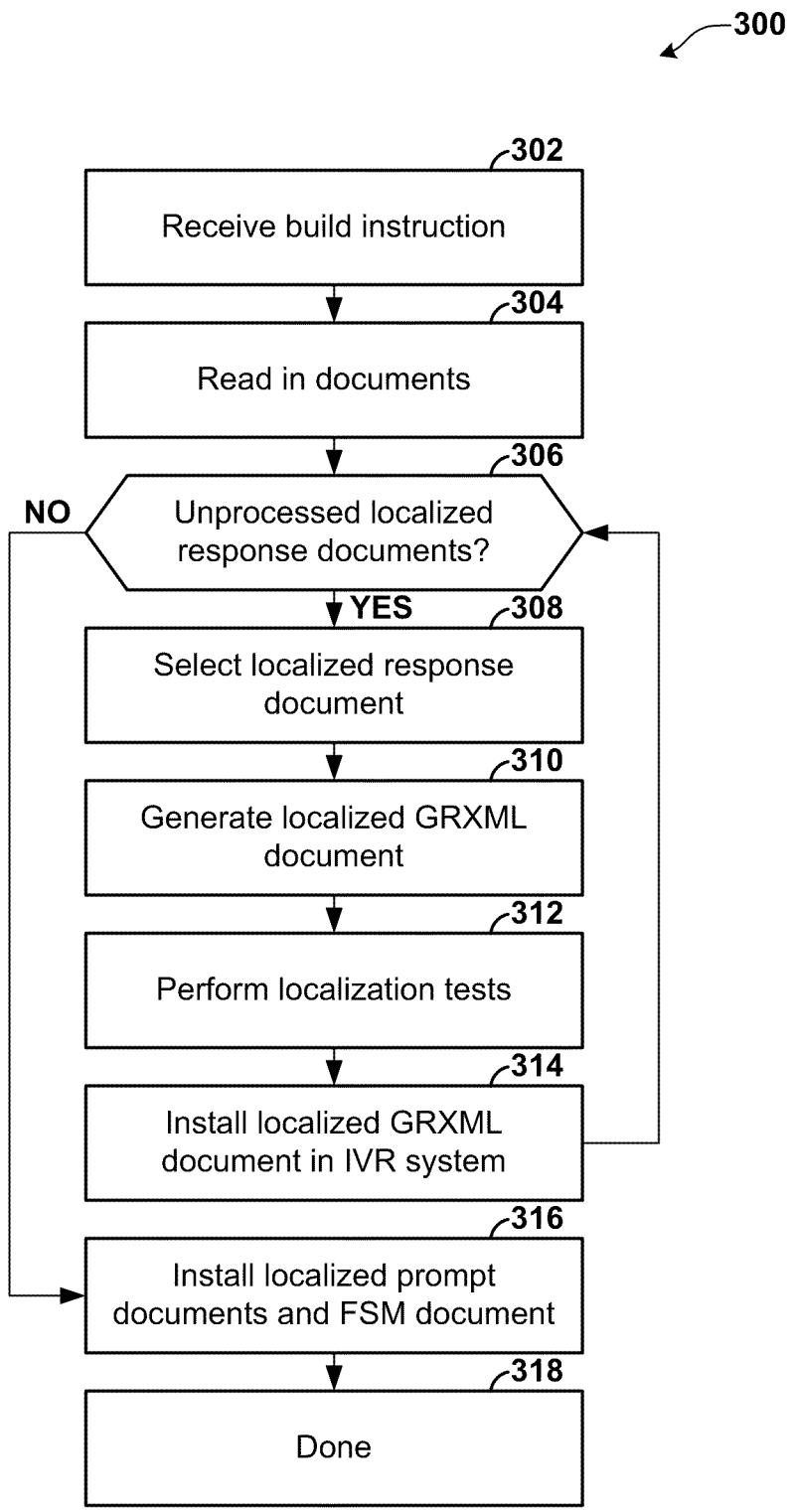
FIG. 3 is a flowchart illustrating an example build process performed by a build system.

FIG. 3 is a flowchart illustrating an example build process 300 performed by the build system 118. As illustrated in the example of FIG. 3, the build process 300 begins when the build system 118 receives a build instruction (302). The build instruction is an instruction to begin a process to generate localized GRXML documents. In various embodiments, the build system 118 receives the build instruction in various ways. For example, in some embodiments, the build system 118 receives the build instruction from a developer via a user interface, such as a native graphical user interface, a command line interface, a web interface, or another type of user interface. In other embodiments, the build system 118 receives the build instruction from another device or software system as part of an automated process.

In response to receiving the build instruction, the build system 118 reads in the language-neutral GRXML document 120, the localized response documents 122, and the localized prompt documents 114 (304). In various embodiments, the build system 118 uses various techniques to determine which documents to read in. For example, in some embodiments, the build system 118 uses a build file that specifies file system paths or URLs of documents to read in. In other embodiments, the build system 118 reads in documents that are stored in a particular directory.

Next, the build system 118 determines whether there are any remaining unprocessed localized response documents (306). If there are one or more remaining unprocessed localized response documents ("YES" of 306), the build system 118 selects one of the remaining unprocessed localized response documents (308). In various embodiments, the build system 118 selects one of the remaining unprocessed localized response documents in various ways. For example, in some embodiments, the build system 118 selects one of the remaining unprocessed localized response documents on a pseudorandom basis. In other embodiments, the build system 118 selects one of the remaining unprocessed localized response documents according to an order based on file names of the localized response documents.

After selecting one of the remaining unprocessed localized response documents, the build system 118 generates a localized GRXML document using the language-neutral GRXML document 120 and the selected localized response document (310). In various embodiments, the build system 118 generates a localized GRXML document using the language-neutral GRXML document 120 and the selected localized response document in various ways. For example, in some embodiments, the build system 118 uses the operation 400 illustrated in the example of FIG. 4 to generate the localized GRXML document. In other embodiments, the build system 118 uses other operations. For instance, the build system 118 could use a recursive algorithm to generate the localized GRXML document.

Next, the build system 118 performs one or more localization tests (312). A localization test is a test to determine whether the IVR system 110 would perform as intended using a localized prompt document and a localized GRXML document. This disclosure describes operations to perform two example localization tests with regard to FIGS. 5 and 6.

After performing one or more localization tests, the build system 118 installs the localized GRXML document in the IVR system 110 (314). In various embodiments, the build system 118 installs the localized GRXML document in the IVR system 110 in various ways. For example, in some embodiments, the build system 118 installs the localized GRXML document in the IVR system 110 by storing the localized GRXML document in a folder in which the IVR system 110 looks for localized GRXML documents. In another example, the build system 118 installs the localized GRXML document in the IVR system 110 by modifying a configuration setting of the IVR system 110 to indicate a path to the localized GRXML document. After the localized GRXML document is installed in the IVR system 110, the selected localized response document is considered to be processed.

After installing the localized GRXML document in the IVR system 110, the build system 118 again determines whether there are any remaining unprocessed localized response documents (306). If there are no remaining unprocessed localized response documents ("NO" of 306), the build system 118 installs the localized prompt documents 114 and, if necessary, the FSM document 112 in the IVR system 110 (316). In various embodiments, the build system 118 installs the localized prompt documents 114 and the FSM document 112 in the IVR system 110 in various ways. For example, in some embodiments, the build system 118 installs the localized prompt documents 114 and/or the FSM document 112 in the IVR system 110 by storing the localized prompt documents 114 and/or the FSM document 112 in folders in which the IVR system 110 looks for the localized prompt documents 114 and/or the FSM document 112. In another example, the build system 118 installs the localized prompt documents 114 and/or the FSM document 112 in the IVR system 110 by modifying a configuration setting of the IVR system 110 to indicate paths to the localized prompt documents 114 and/or the FSM document 112. It may not be necessary to install the FSM document 112 when the FSM document 112 is already installed in the IVR system 110. After installing the localized prompt documents 114 and the FSM document 112, the build system 118 has completed the build operation 300 (318).

Figure 4:
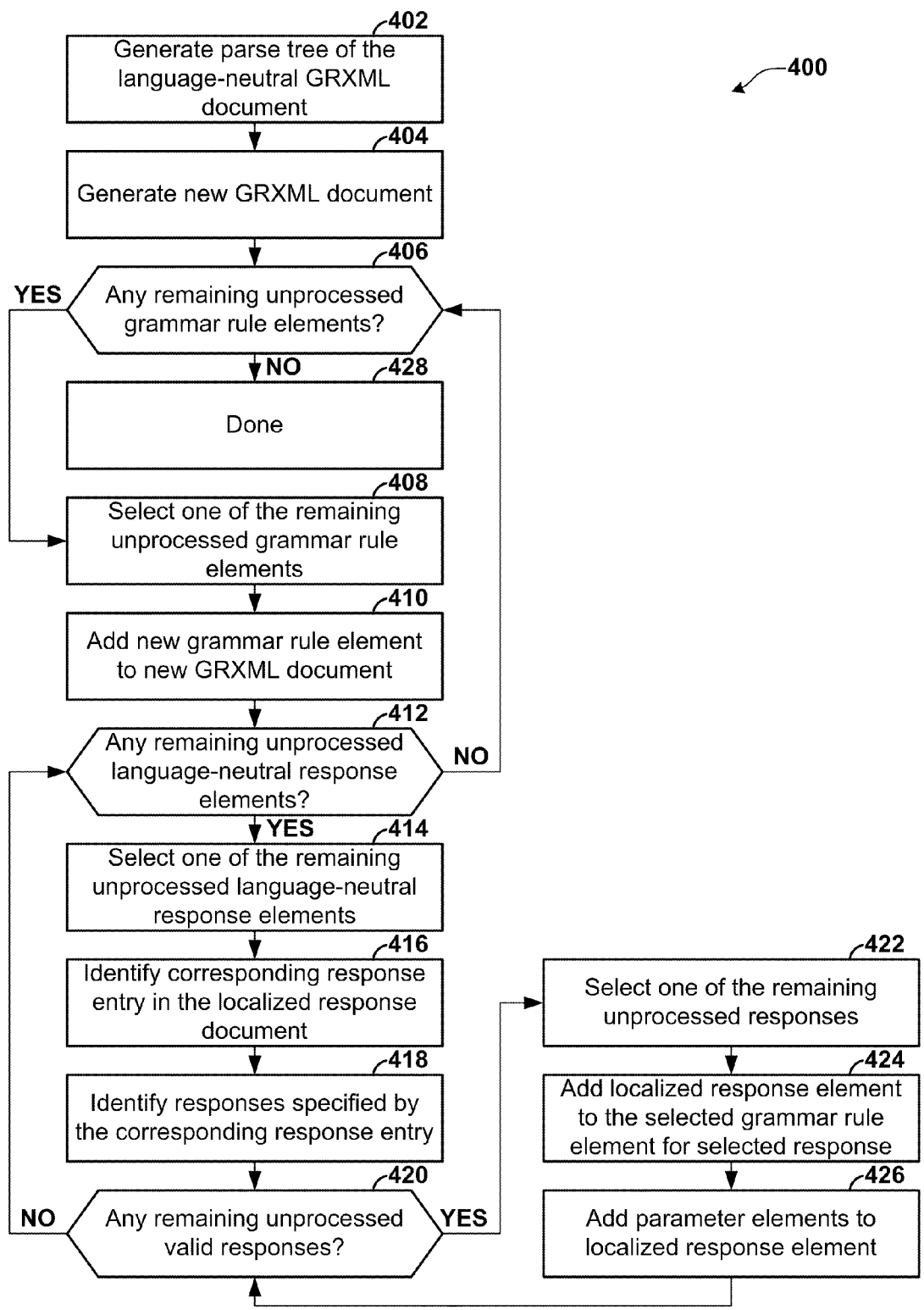
FIG. 4 is a flowchart illustrating an example operation to build a localized speech grammar extensible markup language (GRXML) document using a language-neutral GRXML document and a localized response document.

FIG. 4 is a flowchart illustrating an example operation 400 to build a localized GRXML document using the language-neutral GRXML document 120 and a localized response document. As illustrated in the example of FIG. 4, the operation 400 begins when the build system 118 generates a parse tree of the language-neutral GRXML document 120 (402). The parse tree contains a software object representing each XML element of the language-neutral GRXML document 120. The build system 118 then generates a new GRXML document (404). The new GRXML document is initially empty. In other words, the new GRXML document does not initially contain any XML elements.

After generating the new GRXML document, the build system 118 determines whether there are any remaining unprocessed grammar rule elements in the language-neutral GRXML document 120 (406). When the build system 118 determines that there are one or more remaining unprocessed grammar rule elements in the language-neutral GRXML document 120 ("YES" of 406), the build system 118 selects one of the remaining unprocessed grammar rule elements in the language-neutral GRXML document 120 (408). In various embodiments, the build system 118 selects one of the remaining unprocessed grammar rule elements in various ways. For example, in some embodiments, the build system 118 selects one of the remaining unprocessed grammar rule elements on a pseudorandom basis. In other embodiments, the build system 118 selects one of the remaining unprocessed grammar rule elements based on dependencies among the grammar rule elements in the language-neutral GRXML document 120. In yet other embodiments, the build system 118 selects one of the remaining unprocessed grammar rule elements based on an order of the grammar rule elements in the language-neutral GRXML document 120.

After selecting one of the remaining unprocessed grammar rule elements in the language-neutral GRXML document 120, the build system 118 adds a new grammar rule element to the new GRXML document (410). The new grammar rule element has an id attribute that specifies the grammar rule identifier specified by the selected grammar rule element. Initially, the new grammar rule element does not contain any localized response elements or language-neutral response elements.

After adding the new grammar rule element to the new GRXML document, the build system 118 determines whether there are any remaining unprocessed language-neutral response elements in the selected grammar rule element (412). If there are one or more remaining unprocessed language-neutral response elements in the selected grammar rule element ("YES" of 412), the build system 118 selects one of the remaining unprocessed language-neutral response elements (414).

The build system 118 then identifies a corresponding response entry in the localized response document (416). The corresponding response entry in the localized response document is a response entry that specifies the same response type identifier as the selected language-neutral response element. For example, if the selected language-neutral response element contains a response type identifier element that specifies the response type identifier "grAutumn", the corresponding response entry in the localized response document also specifies the response type identifier "grAutumn".

After identifying the corresponding response entry in the localized response document, the build system 118 identifies responses specified by the corresponding response entry (418). For example, if the corresponding response entry is "grAutumn=Autumn; Fall", the build system 118 identifies "Autumn" and "Fall" as responses specified by the corresponding response entry.

After identifying the responses specified by the corresponding response entry, the build system 118 determines whether there are any remaining unprocessed responses specified by the corresponding response entry (420). If there are one or more remaining unprocessed responses specified by the corresponding response entry ("YES" of 420), the build system 118 selects one of the remaining unprocessed responses (422).

Next, the build system 118 adds a new localized response element to the new grammar rule element in the new GRXML document (424). The new localized response element specifies the selected response and an action element. The action element specifies the action specified by the selected language-neutral response element. After the build system 118 has added the new localized response element to the new grammar rule element in the new GRXML document, the selected response is considered to be processed.

In various embodiments, localized response elements can be formatted in various ways. For example, in some embodiments, localized response elements can be formatted like the following localized response element:

```
<item>
    fall
    <tag>$.Season=Autumn</tag>
</item>
```

In this example, the localized response element specifies the response "fall" and specifies an action element that sets a variable "Season" to the value "Autumn".

Note that because the corresponding response entry can specify multiple responses belonging to a response type, the selected language-neutral response element can effectively be replaced by multiple localized response elements. In a given language, a single concept can be expressed using different words. For example, "fall" and "autumn" can mean the same thing in the English language. By specifying multiple responses in a response entry, a translator can ensure that the IVR system 110 accepts each of the multiple ways of expressing the single concept. In various embodiments, localized response elements that have corresponding response entries that specify multiple responses can be formatted in various ways. For example, localized response elements that have corresponding response entries that specify multiple responses can be formatted like the following localized response element:

```
<item>
    <one-of>
        <item>fall</item>
        <item>autumn</item>
    </one-of>
    <tag>$.Season=Autumn</tag>
</item>
```

After adding the localized response element to the new GRXML document, the build system 118 adds any parameter elements defined in the selected language-neutral response element to the localized response element in the new GRXML document (426). For example, if the selected language-neutral response element contains the parameter element:
    <loc-param><ruleref uri="#CalendarDate"/></loc-param>
The build system 118 adds this parameter element to the localized response element in the new GRXML document. After adding this parameter element to the localized response element, the localized response element could appear as:

```
<item>
    departing {0}
    <loc-param><ruleref uri="#CalendarDate"/></loc-param>
    <tag>$.DepartureDate=$.Year+$.Month+$.Day</tag>
</item>
```

After adding the localized response element to the selected grammar rule element in the new GRXML document, the build system 118 again determines whether there are any remaining unprocessed responses specified by the corresponding response entry (420), and so on. If there are no remaining unprocessed responses specified by the corresponding response entry ("NO" of 420), the build system 118 again determines whether there are any remaining unprocessed language-neutral response elements in the selected grammar rule element (412), and so on. The selected language-neutral response element is considered to be processed when there are no remaining unprocessed responses specified by the response entry corresponding to the selected language-neutral response element.

If there are no remaining unprocessed language-neutral response elements in the selected grammar rule element ("NO" of 412), the build system 118 again determines whether there are any remaining unprocessed grammar rule elements in the language-neutral GRXML document 120 (406), and so on. The selected grammar rule element is considered to be processed when there are no remaining unprocessed language-neutral response elements in the selected grammar rule. If there are no remaining unprocessed grammar rule elements in the language-neutral GRXML document 120 ("NO" of 406), the build system 118 has completed the operation 400 (428). When the build system 118 has completed the operation 400, the new GRXML document has become a localized GRXML document.

Figure 5:
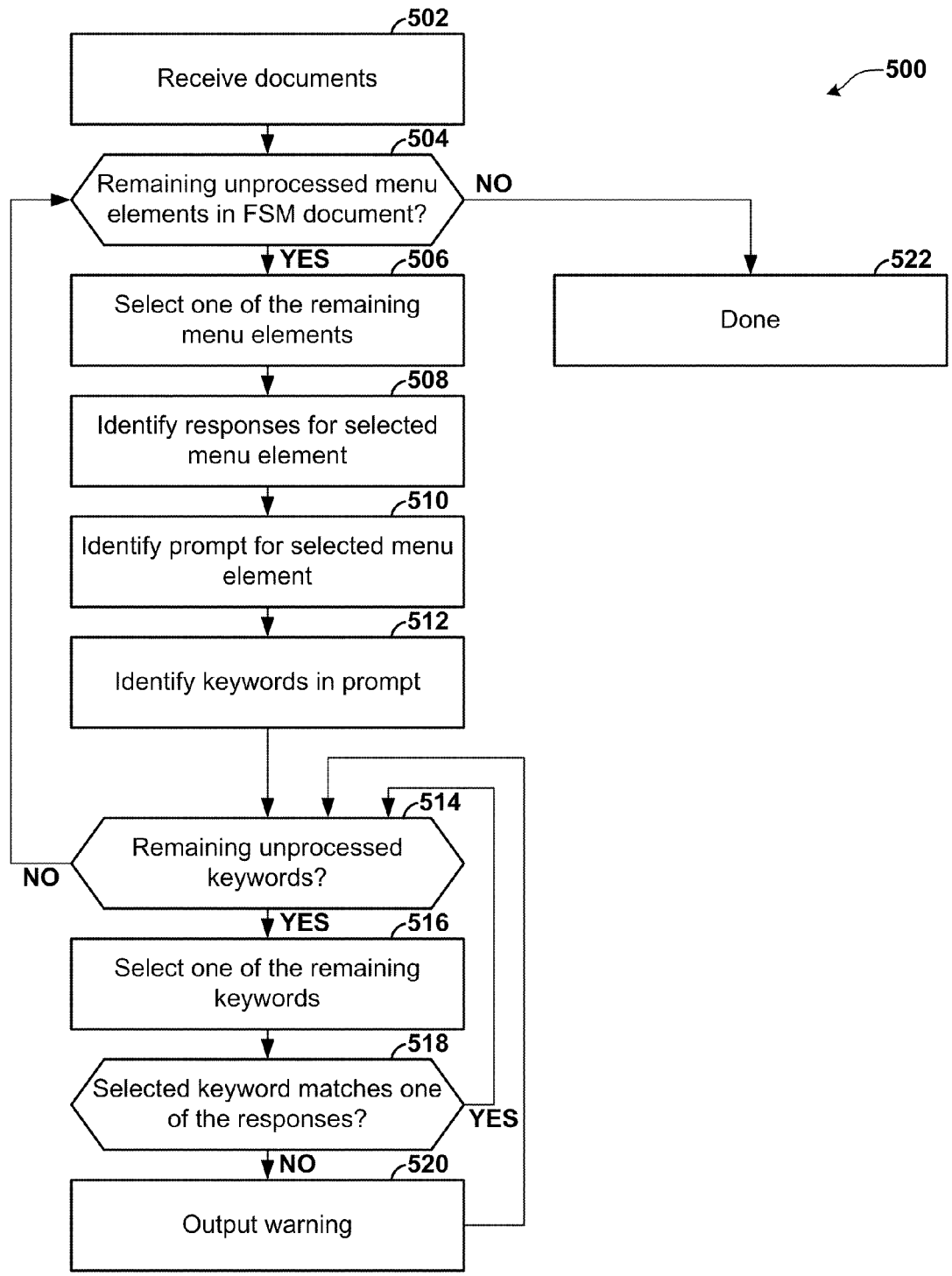
FIG. 5 is a flowchart illustrating an example operation to perform a first localization test.

FIG. 5 is a flowchart illustrating an example operation 500 to perform a first localization test. As illustrated in the example of FIG. 5, the operation 500 begins when the build system 118 receives the FSM document 112, the language-neutral GRXML document 120, one of the localized prompt documents 114, and one of the localized response documents 122 (502). The localized prompt document and the localized response document are associated with the same language.

After receiving the FSM document 112, the localized prompt document, and the localized GRXML document, the build system 118 determines whether the FSM document 112 contains any remaining unprocessed menu elements (504). If the FSM document 112 specifies one or more remaining unprocessed menu elements ("YES" of 504), the build system 118 selects one of the remaining unprocessed menu elements in the FSM document 112 (506). In various embodiments, the build system 118 selects one of the remaining unprocessed menu elements in the FSM document 112 in various ways. For example, in the some embodiments, the build system 118 selects one of the remaining unprocessed menu elements in the FSM document 112 on a pseudorandom basis. Furthermore, in other embodiments, the build system 118 selects one of the remaining unprocessed menu elements in the FSM document 112 according to the order in which the menu elements are defined in the FSM document 112.

The build system 118 then identifies responses for the selected menu element (508). The responses for the selected menu element are responses that a user is allowed to say in response to the prompt identified by the selected menu element. In various embodiments, the build system 118 identifies the responses for the selected menu element in various ways. For example, in some embodiments, to identify the responses for the selected menu element, the build system 118 first identifies in the language-neutral GRXML document 120 a grammar rule element having a grammar rule identifier that matches the grammar rule identifier specified by the selected menu element in the FSM document 112. In this example, the build system 118 then identifies each language-neutral response element in the identified grammar rule element. Next, in this example, the build system 118 identifies response entries in the localized response document that correspond to the response type identifiers of the identified language-neutral response elements. The identified response entries specify the responses for the selected menu element. For instance, the selected menu element can specify the grammar rule identifier "MainMenuGrammarRule" and the language-neutral GRXML document 120 can contain a grammar rule element having the identifier "MainMenu-GrammarRule". In this instance, the grammar rule element can specify a language-neutral response element having the identifier "rVoicemail" and a language-neutral response element having the identifier "rCalendar". Furthermore, in this example, if the localized response document is associated with the Spanish language, the localized response document can have an entry "rVoicemail=buzón de voz" and an entry "rCalendar=calendario". In this example, the build system 118 identifies "buzón de voz" and "calendario" as the responses for the selected menu element.

Next, the build system 118 identifies a prompt for the selected menu element (510). In various embodiments, the build system 118 identifies the prompt for the selected menu element in various ways. For example, in some embodiments, the build system 118 identifies the prompt for the selected menu element by identifying, in the localized prompt document, a prompt entry having a prompt identifier that matches the identifier specified by the prompt element specified in the FSM document 112 for the selected menu element.

After identifying the prompt for the selected menu element, the build system 118 identifies keywords in the prompt (512). Keywords are words or phrases in the prompt that are responses for the selected menu element. In various embodiments, the build system 118 identifies the keywords in various ways. For example, in some embodiments, each keyword in the prompt is enclosed by delimiters, such as quotation marks, apostrophes, parentheses, angle brackets, straight brackets, tags, and other characters or symbols that can be used to indicate the beginning or end of a character string. In this example, the build system 118 identifies the keywords by identifying character strings enclosed by such delimiters. For instance, a prompt can be written as: "Please choose from 'e-mail', 'voicemail', 'directory', or a date". In this instance, the build system 118 identifies "e-mail", "voicemail" and "directory" as keywords. Note that in this instance, a "date" is not a keyword because the word "date" is not a response to the prompt. Rather, it would be expected that the user speak a date, such as "April 14, 2010." In another example, the build system 118 identifies the keywords using a model of a natural language grammar After identifying the keywords in the prompt, the build system 118 determines whether there are any remaining unprocessed keywords in the prompt (514). If there are one or more remaining unprocessed keywords in the prompt ("YES" of 514), the build system 118 selects one of the remaining unprocessed keywords (516). In various embodiments, the build system 118 selects one of the remaining unprocessed keywords in various ways. For example, in some embodiments, the build system 118 selects one of the remaining unprocessed keywords on a pseudorandom basis. In another example, the build system 118 selects the next keyword as the keywords appear in the prompt.

The build system 118 then determines whether the selected keyword matches one of the responses for the selected menu element (518). If the selected keyword does not match one of the responses for the selected menu element ("NO" of 518), the build system 118 outputs a warning (520). The warning indicates that the selected keyword does not match one of the responses for the selected menu element. For example, the selected keyword could be "voicemail". In this example, if "voicemail" is not one of the responses for the selected menu element, the build system 118 outputs a warning.

In various embodiments, the build system 118 outputs the warning in various ways. For example, in some embodiments, the build system 118 outputs the warning by displaying a graphical user interface element containing the warning. In another example, the build system 118 outputs the warning to a file that is presented after the first localization test is complete.

There may be a variety of reasons why a keyword in a prompt might not match one of the responses for the prompt. For example, when a translator translates the prompt and responses in a response entry, the translator might not realize that the responses in the response entry are meant to be used with the prompt. Consequently, the translator could translate a word in the prompt and the same word in the set of responses in different ways. For example, the words "e-mail" and "courriel" have the same meaning in the French language. In this example, the prompt and set of responses could originally include the English word "e-mail". However when translator translates the prompt, the translator could leave the word "e-mail" in the prompt, but use the term "courriel" in the set of responses. This could result in confusion to an end user because the prompt would instruct the end user to say "e-mail," but "e-mail" would not be a response to the prompt.

After outputting the warning or after the build system 118 determines that the selected keyword matches one of the responses ("YES" of 518), the build system 118 again determines whether there are any remaining unprocessed keywords in the prompt for the selected menu element (514), and so on. The selected keyword is considered processed after the build system 118 outputs a warning or after the build system 118 determines that the selected keyword matches one of the responses.

If the build system 118 determines that there are no remaining unprocessed keywords in the prompt for the selected menu element ("NO" of 514), the build system 118 again determines whether there are any remaining unprocessed menu elements in the FSM document 112 (504), and so on. The selected menu element is considered processed after the build system 118 determines that there are no remaining unprocessed keywords in the prompt for the selected menu element. If the build system 118 determines that there are no remaining unprocessed menu elements in the FSM document 112 ("NO" of 504), the operation 500 is complete (522).

Figure 6:
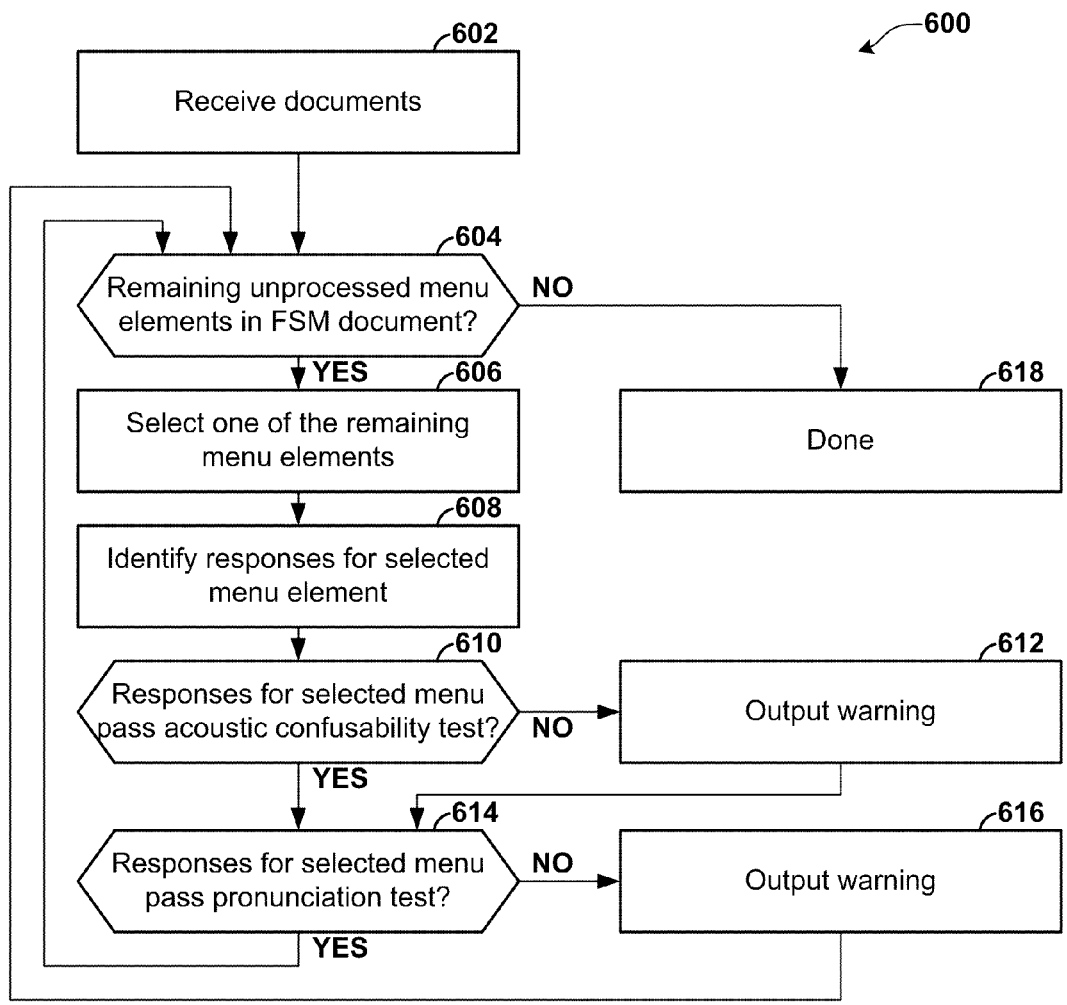
FIG. 6 is a flowchart illustrating an example operation to perform a second localization test.

FIG. 6 is a flowchart illustrating an example operation 600 of the build system 118 to perform a second localization test. As illustrated in the example of FIG. 6, the operation 600 begins when the build system 118 receives the FSM document 112, the language-neutral GRXML document 120, and one of the localized response documents 122 (602).

Next, the build system 118 determines whether there are any remaining unprocessed menu elements in the FSM document 112 (604). If there are one or more remaining unprocessed menu elements in the FSM document 112 ("YES" of 604), the build system 118 selects one of the remaining unprocessed menu elements in the FSM document 112 (606). In various embodiments, the build system 118 selects one of the remaining unprocessed menu elements in the FSM document 112 in various ways. For example, in some embodiments, the build system 118 selects one of the remaining unprocessed menu elements in the FSM document 112 on a pseudorandom basis. Furthermore, in other embodiments, the build system 118 selects one of the remaining unprocessed menu elements in the FSM document 112 according to the order in which the menu elements are defined in the FSM document 112.

After selecting one of the remaining unprocessed menu elements in the FSM document 112, the build system 118 uses the language-neutral GRXML document 120 and the localized response document to identify responses for the selected menu element (608). After identifying the responses for the selected menu element, the build system 118 determines whether the responses for the selected menu element pass an acoustic confusability test (610). The acoustic confusability test determines whether two or more of the responses are acoustically confusable. Two responses are acoustically confusable when the IVR system 110 would perform different actions in response to the responses and there is a significant possibility that the IVR system 110 would confuse one of the responses for the other response. For example, the IVR system 110 could potentially confuse the words "delete" and "repeat" because these words have similar sounding endings. The responses for the selected menu element pass the acoustic confusability test if none of the responses for the selected menu element are acoustically confusable with any other one of the responses for the selected menu element.

In various embodiments, the build system 118 determines whether the responses for the selected menu element pass the acoustic confusability test in various ways. For example, in some embodiments, the build system 118 provides each of the responses specified by the response entry to the Speech API (SAPI) provided by MICROSOFT™ Corporation. In this example, the build system 118 then provides speech data to the SAPI. The speech data represents a spoken version of one of the responses specified by the response entry. The SAPI then returns a confidence value for each of the responses specified by the response entry. A confidence value for a response indicates how confident the SAPI is that the speech data corresponds to the response. If the confidence values for two of the responses are within a given distance from each other, the two responses are deemed to be acoustically confusable with one another. In various embodiments, various distances are used to determine whether two responses are acoustically confusable with one another. For example, in some embodiments, the confidence values are on a scale from 0 to 1. In this example, the build system 118 can determine that two responses are acoustically confusable when their confidence values differ by 0.04 or less. The build system 118 can provide speech data representing each response specified by the response entry. In this way, the build system 118 determines whether any of the responses are acoustically confusable with one another. Furthermore, in some embodiments, the build system 118 can provide to the SAPI several different sets of speech data representing spoken versions of the same response. In this way, the build system 118 can check whether responses, when spoken in different ways, are acoustically confusable.

If the build system 118 determines that the responses for the selected menu element do not pass the acoustic confusability test ("NO" of 610), the build system 118 outputs a warning (612). The warning indicates that the responses for the selected menu element do not pass the acoustic confusability test. In various embodiments, the build system 118 outputs the warning in various ways. For example, in some embodiments, the build system 118 displays a graphical user interface element containing the warning. In other embodiments, the build system 118 outputs the warning to a file. Furthermore, in various embodiments, the warning has various contents. For example, in some embodiments, the warning specifies which ones of the responses do not pass the acoustic confusability test. In other embodiments, the warning specifies generically that at least one of the responses does not pass the acoustic confusability test.

After outputting the warning or after determining that the responses for the selected menu element pass the acoustic confusability test ("YES" of 610), the build system 118 determines whether the responses for the selected menu element pass a pronunciation test (614). To recognize a word, the IVR system 110 compares data representing a sound against sets of data representing sounds of individual known words as they are pronounced. The IVR system 110 recognizes a word when the IVR system 110 receives data that represents a sound that is sufficiently similar to a sound represented by one of the sets of data. The pronunciation test determines whether the IVR system 110 is configured to recognize the responses for the selected menu element. In other words, the pronunciation test determines whether the IVR system 110 has sets of data that represent the sounds of each of the responses for the selected menu element. If the IVR system 110 does not have a set of data that represents the sound of one of the responses for the selected menu element, the set of responses does not pass the pronunciation test.

If the responses for the selected menu element do not pass the pronunciation test ("NO" of 614), the build system 118 outputs a warning (616). The warning indicates that at least one of the responses for the selected menu element does not pass the pronunciation test. In various embodiments, the build system 118 outputs the warning in various ways. For example, in some embodiments, the build system 118 displays a graphical user interface element containing the warning. In other embodiments, the build system 118 outputs the warning to a file. Furthermore, in various embodiments, the warning has various contents. For example, in some embodiments, the warning specifies which ones of the responses do not pass the pronunciation test. In other embodiments, the warning specifies generically that at least one of the responses does not pass the pronunciation test.

After the build system 118 outputs the warning or after the build system 118 determines that the responses for the selected menu element pass the pronunciation test ("YES" of 614), the build system 118 again determines whether there are any remaining unprocessed menu elements in the FSM document 112 (604), and so on. The selected menu element is considered processed after the build system 118 outputs the warning in step 616 or after the build system 118 determines that the responses for the selected menu element pass the pronunciation test in step 614. If the build system 118 determines that there are no remaining unprocessed menu elements in the FSM document 112 ("NO" of 604), the build system 118 has completed the second localization test (618).

Figure 7:
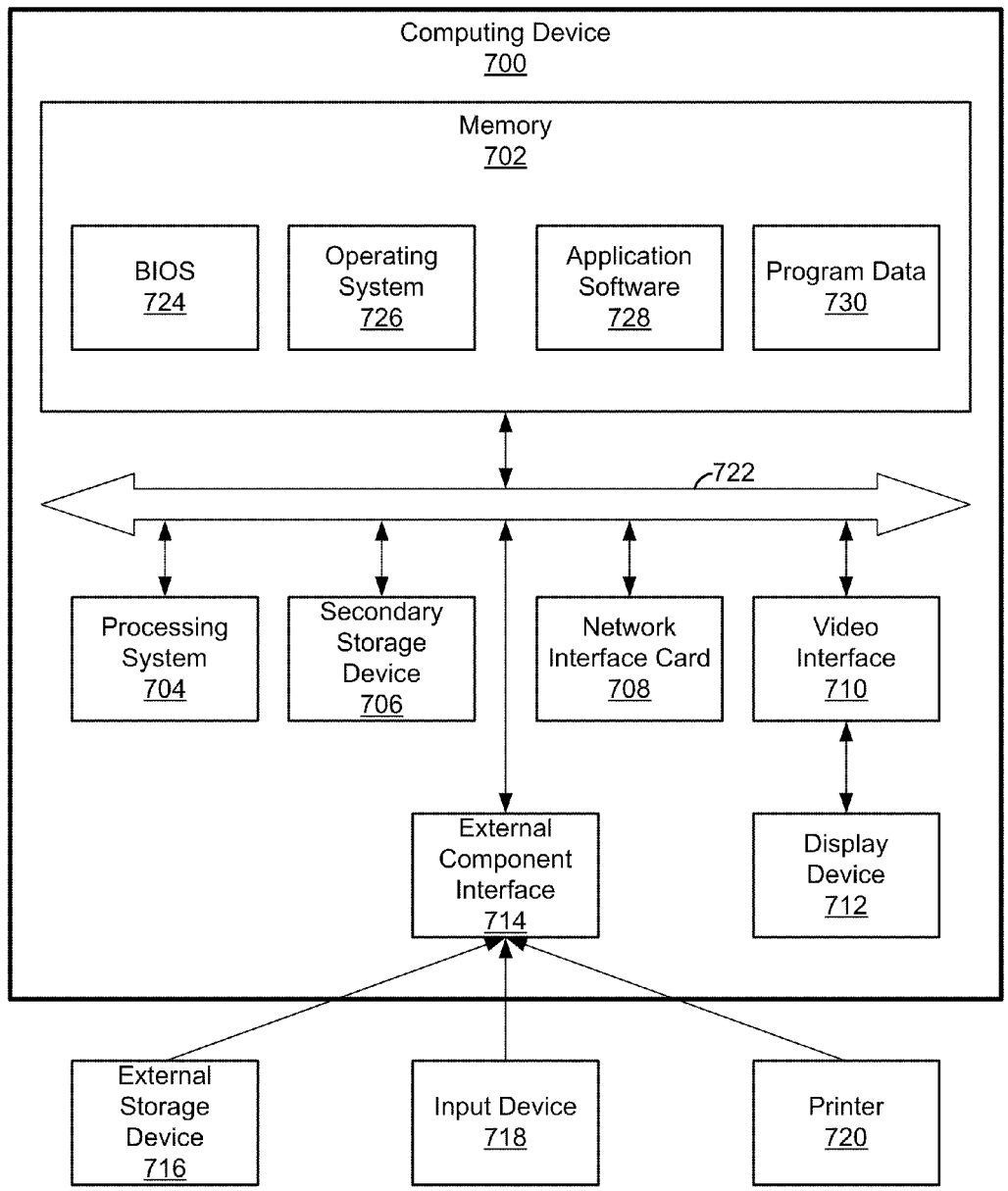
FIG. 7 is a block diagram illustrating an example computing device usable in the communication system.

FIG. 7 is a block diagram illustrating an example computing device 700 usable in the communication system 100. In some embodiments, the server system 102 and the communication devices 104 are implemented using one or more computing devices like the computing device 700. It should be appreciated that in other embodiments, the server system 102 and the communication devices 104 are implemented using computing devices having hardware components other than those illustrated in the example of FIG. 7.

In different embodiments, computing devices are implemented in different ways. For instance, in the example of FIG. 7, the computing device 700 comprises a memory 702, a processing system 704, a secondary storage device 706, a network interface card 708, a video interface 710, a display device 712, an external component interface 714, an external storage device 716, an input device 718, a printer 720, and a communication medium 722. In other embodiments, computing devices are implemented using more or fewer hardware components. For instance, in another example embodiment, a computing device does not include a video interface, a display device, an external storage device, or an input device.

The memory 702 includes one or more computer-readable data storage media capable of storing data and/or instructions.

In different embodiments, the memory 702 is implemented in different ways. For instance, in various embodiments, the memory 702 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 704 includes one or more physical integrated circuits that selectively execute software instructions. In various embodiments, the processing system 704 is implemented in various ways. For instance, in one example embodiment, the processing system 704 is implemented as one or more processing cores. For instance, in this example embodiment, the processing system 704 may be implemented as one or more Intel Core 2 microprocessors. In another example embodiment, the processing system 704 is implemented as one or more separate microprocessors. In yet another example embodiment, the processing system 704 is implemented as an ASIC that provides specific functionality. In yet another example embodiment, the processing system 704 provides specific functionality by using an ASIC and by executing software instructions.

In different embodiments, the processing system 704 executes software instructions in different instruction sets. For instance, in various embodiments, the processing system 704 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 706 includes one or more computer-readable data storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 is implemented by various types of computer-readable data storage media. For instance, the secondary storage device 706 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 708 enables the computing device 700 to send data to and receive data from a computer communication network. In different embodiments, the network interface card 708 is implemented in different ways. For example, in various embodiments, the network interface card 708 is implemented as an Ethernet interface, a token-ring network interface, a fiber optic network interface, a wireless network interface (e.g., WiFi, WiMax, etc.), or another type of network interface.

The video interface 710 enables the computing device 700 to output video information to the display device 712. In different embodiments, the video interface 710 is implemented in different ways. For instance, in one example embodiment, the video interface 710 is integrated into a motherboard of the computing device 700. In another example embodiment, the video interface 710 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 712 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 710 communicates with the display device 712 in various ways. For instance, in various embodiments, the video interface 710 communicates with the display device 712 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 714 enables the computing device 700 to communicate with external devices. In various embodiments, the external component interface 714 is implemented in different ways. For instance, in one example embodiment, the external component interface 714 is a USB interface. In other example embodiments, the computing device 700 is a FireWire interface, a serial port interface, a parallel port interface, a PS/2 interface, and/or another type of interface that enables the computing device 700 to communicate with external components.

In different embodiments, the external component interface 714 enables the computing device 700 to communicate with different external components. For instance, in the example of FIG. 7, the external component interface 714 enables the computing device 700 to communicate with the external storage device 716, the input device 718, and the printer 720. In other embodiments, the external component interface 714 enables the computing device 700 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 700.

The external storage device 716 is an external component comprising one or more computer readable data storage media. Different implementations of the computing device 700 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 718 is an external component that provides user input to the computing device 700. Different implementations of the computing device 700 interface with different types of input devices. Example types of input devices include, but are not limited to, keyboards, mice, trackballs, stylus input devices, key pads, microphones, joysticks, touch-sensitive display screens, and other types of devices that provide user input to the computing device 700. The printer 720 is an external device that prints data to paper. Different implementations of the computing device 700 interface with different types of printers. Example types of printers include, but are not limited to laser printers, ink jet printers, photo printers, copy machines, fax machines, receipt printers, dot matrix printers, or other types of devices that print data to paper.

The communications medium 722 facilitates communication among the hardware components of the computing device 700. In different embodiments, the communications medium 722 facilitates communication among different components of the computing device 700. For instance, in the example of FIG. 7, the communications medium 722 facilitates communication among the memory 702, the processing system 704, the secondary storage device 706, the network interface card 708, the video interface 710, and the external component interface 714. In different implementations of the computing device 700, the communications medium 722 is implemented in different ways. For instance, in different implementations of the computing device 700, the communications medium 722 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 724, an operating system 726, application software 728, and program data 730. The BIOS 724 includes a set of software instructions that, when executed by the processing system 704, cause the computing device 700 to boot up. The operating system 726 includes a set of software instructions that, when executed by the processing system 704, cause the computing device 700 to provide an operating system that coordinates the activities and sharing of resources of the computing device 700. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 728 includes a set of software instructions that, when executed by the processing system 704, cause the computing device 700 to provide applications to a user of the computing device 700. The program data 730 is data generated and/or used by the application software 728.

The various embodiments described above are provided by way of illustration only and should not be construed as limiting. Those skilled in the art will readily recognize various modifications and changes that may be made without following the example embodiments and applications illustrated and described herein. Furthermore, it should be appreciated that use of the terms "first," "second," "third," etc. in the follow claims should not necessarily be taken to imply a sequence. Rather, the terms "first," "second," "third," and the like are merely used as labels for different elements.

We claim:

1. A method comprising:
 using, by a computing system, a language-neutral speech grammar extensible markup language (GRXML) document and a localized response document to build a localized GRXML document,
  the language-neutral GRXML document and the localized response document being separate documents,
  the language-neutral GRXML document specifying an initial grammar rule element, the initial grammar rule element specifying a given response type identifier and a given action,
  the localized response document containing a given response entry that specifies the given response type identifier and a given response in a given language,
  the localized GRXML document specifying a new grammar rule element, the new grammar rule element specifying the given response in the given language and the given action; and
 installing the localized GRXML document in an IVR system, the localized GRXML document configuring the IVR system to perform the given action when a user of the IVR system speaks the given response to the IVR system.

2. The method of claim 1,
 wherein the localized response document contains a plurality of response entries, the plurality of response entries including the given response entry; and
 wherein using the language-neutral GRXML document and the localized response document to build the localized GRXML document comprises: using the given response type identifier to identify the given response entry from among the plurality of response entries.

3. The method of claim 2,
 wherein the initial grammar rule element specifies a grammar rule identifier; and
 wherein using the language-neutral GRXML document and the localized response document to build the localized GRXML document comprises:
  adding the new grammar rule element to the localized GRXML document, the new grammar rule element specifying the grammar rule identifier; and
  after using the given response type identifier to identify the given response entry, adding a localized response element to the new grammar rule element, the localized response element specifying the given response and the given action.

4. The method of claim 3,
 wherein the given response entry specifies a plurality of responses, the plurality of responses including the given response; and
 wherein using the language-neutral GRXML document and the localized response document to build the localized GRXML document comprises: for each response in the plurality of responses, adding a new localized response element to the new grammar rule element, the new localized response element specifying the given response and the given action.

5. The method of claim 4,
 wherein the initial grammar rule element contains a parameter element, the parameter element specifying another grammar rule identifier that identifies another grammar rule element in the language-neutral GRXML document;
 wherein the given response contains a parameter indicator that indicates the parameter element; and
 wherein using the language-neutral GRXML document and the localized response document to build the localized GRXML document comprises: adding the parameter element to the new localized response element.

6. The method of claim 1, further comprising:
 installing a localized prompt document in the IVR system, the localized prompt document comprising a prompt entry that specifies a prompt identifier and a prompt, the prompt being in the given language, the IVR system configured to speak the prompt to the user.

7. The method of claim 6 further comprising:
 identifying keywords in the prompt; and
 outputting a warning when one or more of the keywords is not a response specified by the given response entry.

8. The method of claim 7,
 wherein each keyword in the prompt is enclosed by delimiters; and
 wherein identifying keywords in the prompt comprises identifying character strings enclosed by delimiters.

9. The method of claim 6 further comprising: installing a finite state machine (FSM) document in the IVR system, the FSM document containing a menu element, the menu element containing a prompt identifier element and a grammar identifier element, the prompt identifier element specifying the prompt identifier, the grammar identifier element specifying a grammar rule identifier that identifies the initial grammar rule element.

10. The method of claim 1 further comprising: outputting, by the computing system, a warning when two or more responses specified by the given response entry in the localized response document are acoustically confusable.

11. The method of claim 1 further comprising: outputting, by the computing system, a warning when the IVR system is not configured to recognize one or more responses specified by the given response entry.

12. A computing system comprising:
a processing system; and
a data storage system comprising instructions that, when executed by the processing system, cause the computing system to:
  use a language-neutral speech grammar extensible markup language (GRXML) document and a localized response document to build a localized GRXML document,
    the language-neutral GRXML document and the localized response document being separate documents,
    the language-neutral GRXML document specifying an initial grammar rule element, the initial grammar rule element specifying a given response type identifier and a given action,
    the localized response document containing a given response entry that specifies the given response type identifier and a given response in a given language,
    the localized GRXML document specifying a new grammar rule element, the new grammar rule element specifying the given response in the given language and the given action; and
  wherein the localized GRXML document, when installed at an IVR system, configures the IVR system to perform the given action when a user of the IVR system speaks the given response to the IVR system.

13. The computing system of claim 12,
wherein the localized response document contains a plurality of response entries, the plurality of response entries including the given response entry; and
wherein the instructions, when executed by the processing system, cause the computing system to use the given response type identifier to identify the given response entry from among the plurality of response entries.

14. The computing system of claim 13,
wherein the initial grammar rule element specifies a grammar rule identifier; and
wherein the instructions, when executed by the processing system, cause the computing system to:
  add the new grammar rule element to the localized GRXML document, the new grammar rule element specifying the grammar rule identifier; and
  after using the given response type identifier to identify the given response entry, add a localized response element to the new grammar rule element, the localized response element specifying the given response and the given action.

15. The computing system of claim 14,
wherein the given response entry specifies a plurality of responses, the plurality of responses including the given response; and wherein, for each response in the plurality of responses, the instructions, when executed by the processing system, cause the computing system to add a new localized response element to the new grammar rule element, the new localized response element specifying the given response and the given action.

16. The computing system of claim 15,
wherein the initial grammar rule element contains a parameter element, the parameter element specifying another grammar rule identifier that identifies another grammar rule element in the language-neutral GRXML document;
wherein the given response contains a parameter indicator that indicates the parameter element; and
wherein the instructions, when executed by the processing system, cause the computing system to add the parameter element to the new localized response element.

17. The computing system of claim 12, wherein the instructions, when executed by the processing system, further cause the computing system to:
  install a localized prompt document in the IVR system, the localized prompt document comprising a prompt entry that specifies a prompt identifier and a prompt, the prompt being in the given language, the IVR system configured to speak the prompt to the user;
  identify keywords in the prompt; and
  output a warning when one or more of the keywords is not a response specified by the given response entry.

18. The computing system of claim 12, wherein the instructions, when executed by the processing system, cause the computing system to output a warning when two or more responses specified by the given response entry in the localized response document are acoustically confusable.

19. The computing system of claim 12, wherein the instructions, when executed by the processing system, cause the computing system to output a warning when the IVR system is not configured to recognize one or more responses specified by the given response entry.

20. A computer-readable data storage medium comprising instructions that, when executed by a processing system of a computing system, cause the computing system to:
  receive a localized prompt document comprising a prompt entry that specifies a prompt identifier and a prompt, the prompt being in a given language;
  receive a language-neutral speech grammar extensible markup language (GRXML) document that specifies a grammar rule element, the grammar rule element specifying a grammar rule identifier, a given response type identifier, and a given action, the grammar rule element contains a parameter element, the parameter element specifying another grammar rule identifier that identifies another grammar rule element in the language-neutral GRXML document;
  receive a localized response document containing a plurality of response entries, the plurality of response entries including a given response entry, the given response entry specifying the given response type identifier and a plurality of responses in the given language, the plurality of responses including a given response, the given response containing a parameter indicator that indicates the parameter element;
  use the given response type identifier to identify the given response entry from among the plurality of response entries;
  generate a new GRXML document, the new GRXML document not initially containing any XML elements;

add a new grammar rule element to the new GRXML document, the new grammar rule element specifying the grammar rule identifier;

for each response in the plurality of responses, add a new localized response element to the new grammar rule element, the new localized response element specifying the response and the given action;

add the parameter element to the new localized response element;

identify keywords in the prompt by identifying keywords enclosed by delimiters;

output a warning when one or more of the keywords is not one of the plurality of responses specified by the given response entry;

output a warning when two or more responses in the plurality of responses specified by the given response entry in the localized response document are acoustically confusable;

output a warning when an IVR system is not configured to recognize one or more responses in the plurality of responses specified by the given response entry;

install the localized prompt document in the IVR system, the IVR system configured to speak the prompt to a user of the IVR system;

install a finite state machine (FSM) document in the IVR system, the FSM document containing a menu element, the menu element containing a prompt identifier element and a grammar identifier element, the prompt identifier element specifying the prompt identifier, the grammar identifier element specifying the grammar rule identifier that identifies the grammar rule element;

install the new GRXML document in the IVR system, the new GRXML document configuring the IVR system to perform the given action when the user of the IVR system speaks the given response to the IVR system.

* * * * *